June 16, 1931.   C. C. CHAPEL   1,810,128
DECELERATOR
Filed May 28, 1930
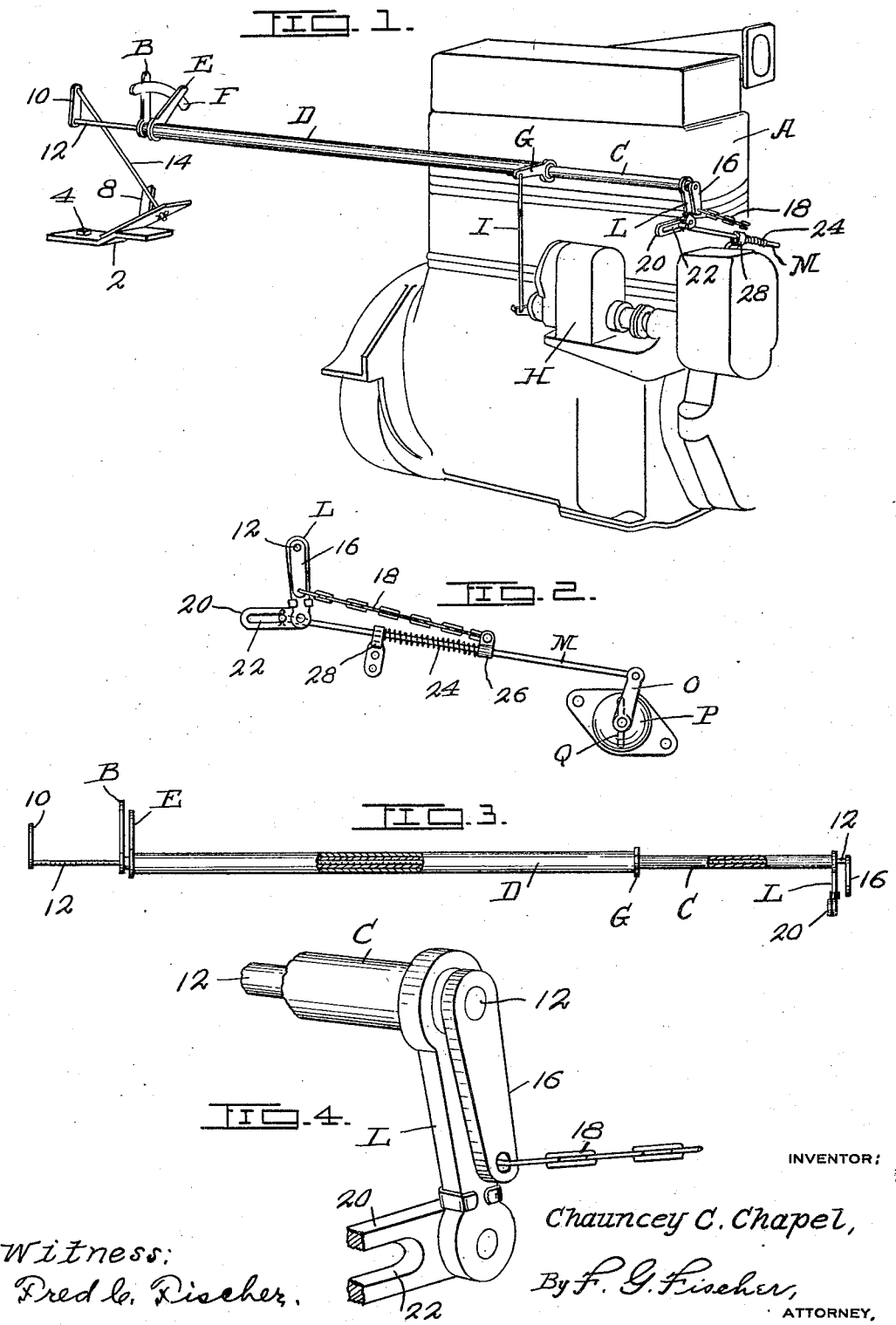
INVENTOR:
Chauncey C. Chapel,
By F. G. Fischer,
ATTORNEY.
Witness:
Fred C. Fischer.

Patented June 16, 1931

1,810,128

UNITED STATES PATENT OFFICE

CHAUNCEY C. CHAPEL, OF SIMPSON, KANSAS

DECELERATOR

Application filed May 28, 1930. Serial No. 456,462.

My invention relates to what I have termed a foot decelerator for internal combustion engines of the type employed in propelling tractors and other automotive vehicles and my main object is to provide simple and efficient mechanism whereby an engine may be prevented from speeding up at such times as when plows or other implements are lifted from the ground, or the draft on the tractor is otherwise diminished.

When working in the field with a tractor some trouble is had in making turns as one hand is used in steering the tractor while the other hand is employed in lifting the plows or other implements out of the ground, thereby making it difficult if not impossible to operate the hand control of the engine throttle for the purpose of controlling the speed of the tractor.

A further object is to provide a device of this character which may be operated independently of the regular spark and throttle control levers of the tractor and thereby avoid the necessity of throwing said levers out of adjustment for ordinary running, which is important as it usually requires some time to readjust said levers.

Another object is to provide a device which can be readily attached to a tractor without necessitating changes in any parts of the latter.

In order that the invention may be fully understood, reference will now be had to the accompanying drawings, in which:

Fig. 1 is a broken perspective view of an engine equipped with the invention.

Fig. 2 shows how the device is connected to the throttle valve.

Fig. 3 is a side elevation, partly in section, of certain parts of the device associated with other parts of the engine controlling mechanism.

Fig. 4 is an enlarged perspective view of the forward portion of some of the parts disclosed by Fig. 3.

Referring to the different parts, A designates the engine block, B the throttle lever which is secured to the tubular shaft C, D the spark control shaft which is tubular and fits over the shaft C, E the hand lever for actuating the shaft D, F the quadrant for holding the levers B and E in their adjusted positions, G a crank fixedly mounted upon the shaft D and connected to the magneto H by a rod I, L a crank fixedly mounted upon the shaft C and M a rod connected to the arm O of the throttle valve Q mounted in the carbureter P. All of the foregoing parts are of any ordinary or preferred construction, and are merely illustrated and described to show their relation to the present invention which will now be described in detail.

2 designates a pedal consisting of spring steel or other resilient material which will automatically spring back and thus restore the parts controlled thereby to their usual position after said pedal has been actuated by the operator. The pedal 2 is fixedly secured at its rear end to a suitable portion of the tractor by suitable means such as a bolt 4, and has its forward portion extending upwardly and provided with a foot guard 8 for preventing the operator's foot from slipping off of said pedal.

10 designates a lever fixedly mounted upon the rear end of a rock shaft 12 and operably connected to the pedal 6 by a rod 14. The shaft 12 is mounted in and extends forwardly through the tubular shaft C and is provided at its forward end with a fixedly mounted lever 16 which is connected to the rod M by flexible means such as a chain 18.

20 designates an arm secured to the free end of the crank L and provided with a longitudinal slot 22 in which the bent end of the rod M is free to slide. The bent end of the rod M is yieldably held in the forward end of the slot 22 by a coiled spring 24 interposed between a clamp 26 and an eye 28, which latter is secured to the front end of the engine A. The clamp 26 affords a suitable connection between the chain 18 and the rod M.

In practice when the draft on the tractor is reduced from any cause as the lifting of plows out of the ground, the tractor may be prevented from speeding up without resorting to the usual hand controlled throttle lever B by depressing the pedal 2 and thereby causing it to pull downwardly upon the connecting rod 14, which in turn swings the crank 10 through a partial revolution and rotates the shaft 12. The lever 16 on the forward end of the shaft 12 is thus caused to rotate a partial revolution and by pulling upon the chain 18, closes the throttle valve Q of the carbureter P to the desired extent. During the foregoing operation the throttle lever B is not disturbed as the bent end of the rod M slides backwardly in the slot 22 and hence does not actuate the crank L. When the operator removes his foot from the pedal 2 the latter springs up and restores the parts 14, 10, 12 and 16 to normal position, while the spring 24 restores the arm O and the rod M to their normal positions so that the speed of the tractor will again be controlled by the throttle lever B and its connections with the throttle arm O.

From the foregoing description it is apparent that I have provided a device which is well adapted for the purpose intended, and while I have shown the preferred embodiment of said invention I reserve all rights to such other forms and modifications thereof as properly fall within the spirit and scope of the invention as claimed.

Having thus described my invention, what I claim and desire to secure by Letters Patent, is:

1. In combination with the throttle valve of an internal combustion engine, rod for controlling said valve, a hand controlled throttle shaft, and a suitable connection between said rod and said throttle shaft; a rock-shaft operably mounted in said throttle shaft, a resilient pedal adapted to return to normal position after being operated for the purpose of effecting closure of said valve to the desired extent, a crank fixed upon said rock-shaft, a rod connecting said crank and the pedal, a second crank fixed to said rock-shaft, and a suitable connection between said second crank and rod for controlling the valve.

2. In combination with the throttle valve of an internal combustion engine, a rod for controlling said valve, a crank for actuating said rod, and a throttle shaft upon which said crank is fixedly mounted; a slotted member secured to said crank and in which one end of said rod is free to slide, spring means for normally holding the end of said rod at one end of the slot in said slotted member, a flexible member connected to said rod, a lever to which said flexible member is connected, a rock shaft operably mounted in said throttle shaft and upon which said lever is fixedly mounted, and foot-controlled means for actuating said rock shaft.

3. In combination with the throttle valve of an internal combustion engine, a rod for controlling said valve, a crank for actuating said rod, and a throttle shaft upon which said crank is fixedly mounted; a slotted member secured to said crank and in which one end of said rod is free to slide, spring means for normally holding the end of said rod at one end of the slot in said slotted member, a flexible member connected to said rod, a lever to which said flexible member is connected, a rock shaft operably mounted in said throttle shaft and upon which said lever is fixedly mounted, a spring pedal, and means whereby said pedal may actuate said rock shaft.

In testimony whereof I affix my signature.

CHAUNCEY C. CHAPEL.